United States Patent Office 3,314,922
Patented Apr. 18, 1967

3,314,922
POLYMERS AND PROCESS OF MAKING SAME
Glenn A. Berchtold, Watertown, Mass., assignor to E. I. du Pont de Nemours and Company, Wilmington, Del., a corporation of Delaware
No Drawing. Filed Aug. 21, 1961, Ser. No. 132,574
9 Claims. (Cl. 260—77.5)

This invention relates to novel polymers and more particularly to polymers prepared by reacting enamines with isocyanate and/or isothiocyanate-terminated polymers.

Higher polymers made from polyisocyanate compositions are steadily increasing in commercial importance today for use in preparing fibers, films, coatings, calks, insulation, molded solid articles, and foam cushions.

It is an object of the present invention to provide novel polymers containing amide and/or thioamide linkages. A still further object is to provide a process for preparing these polymers by reacting enamines with isocyanate and/or isothiocyanate-terminated polymers. Other objects will appear hereinafter.

These and other objects of this invention are accomplished by providing novel polymers which are obtained by reacting an XCN-terminated polymer, wherein X is oxygen or sulfur, with an organic compound having at least one enamine structural unit. In its broadest sense, the present invention provides a method for increasing the molecular weight of these XCN-terminated polymers by forming higher polymers containing amide and/or thioamide linkages.

The XCN-terminated polymers which are reacted with the enamines have at least two XCN-groups per molecule. The molecular weight of these polymers is not critical and can range widely. Frequently it is above 500 and below 20,000. The OCN-terminated polyurethanes are a preferred class. The XCN-terminated polymers are made by reacting a molar excess of compounds having at least two XCN-groups per molecule with an organic compound bearing at least two XCN-reactable sites. These XCN-containing compounds can include simple polyisocyanates and polyisothiocyanates such as toluene-2,4-diisocyanate and hexamethylenediisothiocyanate, dimers and trimers of arylene diisocyanates; XCN-terminated polymers themselves can serve in making higher XCN-terminated polymers, of course. The organic compounds bearing at least two XCN-reactable sites most often are organic compounds having at least 2 groups bearing Zerewitinoff-active hydrogen atoms. In general, these hydrogen atoms are most often attached to oxygen, nitrogen, or sulfur atoms. Kohler in J. Am. Chem. Soc. 49, 3181 (1927) describes a test for such hydrogen atoms. Compounds bearing a plurality of alcoholic hydroxyl groups are preferred. Compounds having Zerewitinoff-active hydrogen atoms are more particularly described in U.S. 2,929,800. Polyester polyols and particularly polyalkyleneether polyols are preferred active hydrogen-containing materials. Polypropyleneether and polytetramethyleneether polyols are especially preferred. The organic compounds bearing at least 2 XCN-reactable sites can also be mono- or polyenamines. Since the process of the present invention can be carried out step-wise, the organic compound having XCN-reactable sites can also be an enamine-terminated reaction product of an enamine and a polyNCX compound.

Polyurethanes are a particularly useful class of polymers which may be employed in the present invention. Representative examples of XCN-terminated polyurethanes include: polyisocyanate-modified polyesters (U.S. Patents 2,620,516; 2,621,166; 2,729,618; French Patent 1,201,467; Australian application 20,059/53); XCN-terminated polyalkyleneether polyurethanes (U.S. Patents 2,726,219; 2,850,461; 2,901,445; 2,901,467; 2,917,489; 2,929,800; British Patents 733,624; 796,044; 797,965); XCN - terminated polyalkyleneether-thioether glycols (U.S. Patent 2,917,489); isocyanate-modified polyether acetals (German Patent 1,045,095); XCN-terminated fatty acid triglycerides (U.S. Patents 2,787,601 and 2,850,461); XCN-terminated castor oil-epoxy resin condensation products (U.S. Patent 2,788,335); and XCN-terminated polysulfides (U.S. Patent 2,814,600).

Other XCN-terminated polyurethanes can be made by reacting monomeric organic polyNCX compounds with hydroxyl-terminated compounds in the conventional manner. Representative monomeric organic polyNCX compounds are described in U.S. Patents 2,728,787; 2,847,440; 2,865,940; 2,891,983; 2,963,504; 2,967,193; 2,978,476; and 2,986,536; and in the review article by Siefken [Ann. 562, 110–135 (1949)]. Representative hydroxyl-terminated compounds include: hydroxyl-terminated polyhydrocarbons (U.S. Patent 2,877,212); hydroxyl-terminated polyformals (U.S. Patent 2,870,097); fatty acid triglycerides (U.S. Patents 2,833,730 and 2,787,601); hydroxyl-terminated polyesters (U.S. Patents 2,698,838, 2,921,915, 2,591,884, 2,866,762, 2,850,476, 2,602,783, 2,729,618, 2,779,689, 2,811,493 and 2,621,166); hydroxymethyl-terminated perfluoromethylenes (U.S. Patents 2,911,390 and 2,902,473); polyalkyleneether glycols (U.S. Patent 2,808,391; British 733,624); polyalkyleneether-aryleneether glycols (U.S. Patent 2,808,391); polyalkyleneether triols (U.S. Patent 2,866,774; German Patent 1,099,726; Australian applications 52,265/59; 52,266/59; 53,373/59; 54,452/59; and Belgian Patent 582,076).

Mixtures of XCN-terminated polymers are also suitable. Thus mixtures of at least two isocyanate-terminated polyurethanes or at least two isothiocyanate-terminated polyurethanes or at least two isocyanate-isothiocyanate terminated polyurethanes or mixtures of at least two of any of these polyurethanes can be used. Furthermore, at least one monomeric polyisocyanate or polyisothiocyanate or isocyanate-isothiocyanate or mixtures of at least two of any of the above-described monomeric compounds can be present with the polymers.

The organic compound which is reacted with the XCN-terminated polymers has at least one enamine structural unit incorporated therein. This structural unit may be represented as follows:

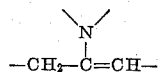

wherein the residual valences are attached to carbon atoms, with the provisos that (1) at least one residual nitrogen valence is attached to an aliphatic carbon atom, (2) any aliphatic carbon atoms attached to the nitrogen atom are primary or secondary, and (3) enamine-reactable substituents are absent. The organic compound can be a monomeric monoenamine of the structure

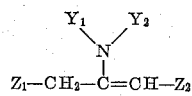

wherein $Y_1$, $Y_2$, $Z_1$, and $Z_2$, which can be the same or different, are hydrocarbon or substituted hydrocarbon radicals, inert toward isocyanates and enamines; with the provisos that (a) $Y_1$ is attached to the nitrogen atom bearing $Y_2$ through a primary or secondary aliphatic carbon atom; (b) at least one of the pairs $Y_1$–$Y_2$ or $Z_1$–$Z_2$ is joined together, said junctions being made directly or through a hetero-atom (S, O, or tertiary nitrogen having a hydrocarbon radical attached thereto) to form a 5 to 7 membered ring, and (c) any aliphatic carbon atom joining $Y_2$ to the nitrogen atom bearing $Y_1$ is primary or secondary. In particular $Y_1$, $Y_2$, $Z_1$, and $Z_2$ can be aliphatic, aromatic-substituted aliphatic, and aliphatic-substituted aromatic hydrocarbon radicals. In turn, these radicals can bear non-hydrocarbon substituents unreactive toward enamines and isocyanates; representative examples include nitro, alkoxy, aryloxy, thioalkoxy, and thioaryloxy groups. These enamines can be made by reacting secondary amines with ketones having the structure

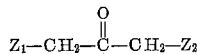

The organic compound can also be a polyenamine such as those made by condensing a secondary polyamine with a ketone, or a secondary amine, with a polyketone. It can be an enamine, terminated polymer of the formula

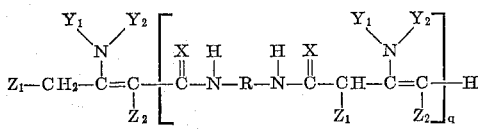

where $Y_1$, $Y_2$, $Z_1$, $Z_2$ and X have the same meaning as defined above; R is a bivalent organic radical inert toward isocyanates and enamines; and $q$ is an integer. They are made by reacting a molar excess of a monoenamine of the structure

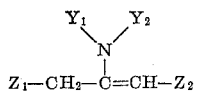

with an organic compound having 2 XCN-groups. Still other representative enamines are polyenamines of the general formula

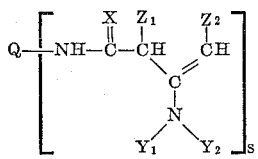

where Q is a polyvalent organic radical inert toward isocyanates and enamines; $s$ is an integer of at least 3. They are made by reacting at least $s$ moles of a monoenamine of the structure

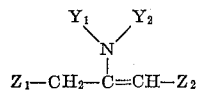

with an organic compound having $s$ XCN-groups.

Representative examples of the monoenamines which may be used in the present invention include:

N,N-diethyl-1-cyclopenten-1-ylamine;
4-ethyl-N,3-dimethyl-N-isopropyl-1-cyclopenten-1-ylamine;
N-butyl-3-tert-butyl-N-propyl-1-cyclopenten-1-ylamine;
N,N-diisoamyl-3-cyclopentyl-1-cyclopenten-1-ylamine;
N-ethyl-N-cyclohexyl-3,4-diphenyl-1-cyclopenten-1-ylamine;
N-methyl-N-(α-phenethyl)-1-cyclohexene-1-ylamine;
N-ethyl-3-methyl-N-(2-naphthyl)-1-cyclohexen-1-ylamine;
1-(N-methyl-o-chloroanilino)-3-tert-butyl-4,4-dimethyl-1-cyclohexene;
1-(N-isoamylanilino)-4-methoxy-1-cyclohexene;
1-(2-penten-3-yl)-piperidine;
1-(3-hepten-3-yl-3-methyl-piperidine;
3-isopropyl-1-(1-ethyl-1-isopenten-1-yl)-piperidine;
1-(3-nonen-3-yl)-3-phenyl-piperidine;
2-benzyl-1-(3-hepten-4-yl)-piperidine
4,4-dimethyl-3-phenyl-1-(6-methyl-3-hepten-3-yl)-piperidine;
3-(4-octen-4-yl)-oxazolidine;
2,4-dimethyl-3-(4-nonen-4-yl)-oxazolidine;
3-(4-hendecen-4-yl)-5-phenyl-oxazolidine;
1-(7-pentadecen-8-yl)-pyrrolidine;
2-n-butyl-1-(8-heptadecen-9-yl)-pyrrolidine;
3-ethyl-1-(6-dodecen-6-)ly-4-phenyl-pyrrolidine;
1-(6-pentaden-6-yl)-hexamethylene-imine;
4-(7-hexadecen-7-yl)-morpholine;
1-(10-heneicosen-11-yl)-thiamorpholine;
4-(13-heptacosen-14-yl)-homomorpholine;
2,6-dimethyl-1-(17-pentatriaconten-18-yl)-morpholine;
1-1-cyclopenten-1-yl)-piperidine;
2-methyl-1-(3-propyl-1-cyclopenten-1-yl)-piperidine;
2,5-diethyl-1-(3-tert-butyl-1-cyclopenten-1-yl)-piperidine;
2-(p-chlorophenyl)-1-(1-cyclohexen-1-yl)-piperidine;
2-(7-methoxyheptyl)-1-(3-benzyl-1-cyclohexen-1-yl)-piperidine;
3-(3-phenylpropyl)-1-(4-amyloxy-1-cyclohexen-1-yl)-piperidine;
2-methyl-3-(4-heptyl-1-cyclohexen-1-yl)-oxazolidine;
3,3-diphenyl-1-(5-ethyl-3-methyl-1-cyclohexen-1-yl) pyrrolidine;
2-methyl-1-(1-cyclopenten-1-yl)hexamethyleneimine;
4-(1-cyclohepten-1-yl) morpholine;
5-ethyl-4(1-cyclohexen-1-yl)-2-methyl morpholine;
4-(3-propyl-1-cyclopenten-1-yl)-thiamorpholine;
4-4-methyl-1-cyclohexen-1-yl)-homomorpholine;
6-methyl-3(2-penten-3-yl)-4-isopropyl-tetrahydro-1,3-oxazine;
4-dodecyl-1-(1-cyclopenten-1-yl)-piperazine;
4-(phenyl)-1-(1-cyclohexen-1-yl)-piperazine and 1-(7-hexadecen-7-yl)-4-methyl-piperazine.

These monoenamines can be made by reacting a ketone

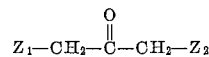

with at least a molar proportion of a secondary amine

where $Y_1$, $Y_2$, $Z_1$, and $Z_2$ have the same meanings previously stated. Frequently about 1.5 to 2 molar proportions of amine are employed. Preferably the condensation is carried out in an inert water-immiscible solvent. By "inert" is meant a solvent which will not affect the desired course of reaction; thus the medium is free from enamine-reactable compounds such as alkyl halides, allylic halides, acyl halides, benzyl halides, water, cyanogen chloride, α,β-unsaturated nitriles, α,β-unsaturated ketones, and α,β-unsaturated esters; furthermore, it is free of acid functions which would tie up the amine and of groups which might tie up the ketone, e.g. vicinal glycols which could form ketals. Aliphatic and aromatic hydrocarbons are preferred, benzene and toluene being particularly preferred. The concentration of reactants is not critical. Frequently about 10–70 grams of reactants are employed for every 100 milliliters of solvent. A catalyst is optional; occasionally 0.05–5 grams of p-toluene sulfonic acid are added for every gram-mole of ketone. The reaction temperature is not critical; temperatures between about 80 and 120° C. are often very satisfactory. The progress of the reaction can be followed by measuring the amount of water which is formed. The reaction time needed will frequently range between about 10 to 300 hours, 10–50 often sufficing. The lower the temperature and the more sterically hindered the reactants, the longer the time. In a representative procedure a solution of 30 grams of cyclopentanone and 46.5 grams of morpholine in 300 milliliters of toluene are refluxed at atmospheric pressure under a water separator (e.g. Dean-Starke tube) for 20–30 hours. The solvent is then removed by distillation at atmospheric pressure and the residue fractionated through a Vigreux column. Examples of preparations of this type are given in the Ph.D. Thesis of A. A. Brizzolara (Columbia University, 1960). Enamines can be made by the method described in U.S. Patent 2,773,087. The procedures disclosed in Methoden der Organischen Chemie, Houben-Weyl, vol. II (Stickstoff verbindungen), page 171, are also useful.

A representative dienamine can be prepared by condensing 2 mols of cyclohexanone with one mol of piperazine. Other non-polymeric dienamines can be made by condensing ketones having the structure

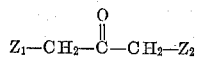

with secondary diamines wherein each nitrogen atom is attached to at least one aliphatic carbon atom, said aliphatic carbon atoms being primary or secondary. Representative ketones include:

3-pentanone
3-hexanone
3-heptanone
5-methyl-3-hexanone
3-nonanone
3-undecanone
4-heptanone
6-methyl-3-heptanone
4-octanone
4-nonanone
6-hendecanone
8-pentadecanone
9-heptadecanone
6-dodecanone
6-pentadecanone
7-hexadecanone
11-heneicosanone
15-heptacosanone
18-pentacontanone
cyclopentanone
3-methylcyclopentanone
3-ethyl-4-methylcyclopentanone
3-propylcyclopentanone
3-cyclopentylcyclopentanone
3,4-diphenylcyclopentanone
3-tert-butyl-cyclopentanone
cyclohexanone
3-chlorocyclohexanone
4-methylcyclohexanone
3-isopropylcyclohexanone
3-methyl-5-ethylcyclohexanone
4-benzylcyclohexanone
3-isobutyl-4,4-dimethyl-cyclohexanone
4-isoamoxycyclohexanone
3-tert-butyl-cyclohexanone
4-heptyl-cyclohexanone
4-methoxycyclohexanone
cycloheptanone
dibenzylketone Representative diamines include:

N,N'-dimethyl-1,3-toluenediamine
N,N'-di-sec-butyl-1,3-toluenediamine
N,N'-di-sec-butyl-1,3-phenylenediamine
N,N'-di-sec-butyl-1,4-phenylenediamine
N,N'-di-n-hexyl-1,4-phenylenediamine
N,N'-dibenzyl-1,4-phenylenediamine
N-isopropyl, N'-isobutyl-1,4-phenylenediamine, N,N'-di-isopropyl-1,4-phenylenediamine
N-methyl, N'-isobutyl-1,4-phenylenediamine
N,N'-diphenyl-ethylenediamine, which is preferred
N,N'-diphenyl-1,3-diaminopropane
N,N'-diphenyl-2,3-butanediamine
N,N'-di-o-tolylethylenediamine
N,N'-di-o-tolyl-1,4-xylyldiamine
4,4'-methylene bis(N-methyl-aniline)
4,4'-methylene bis(N-sec-butyl-aniline)
4,4'-methylene bis(2-chloro-N-methyl-aniline)
4,4'-methylene bis(2-methyl-N-ethyl-aniline) and
4,4'-methylene bis(2-methoxy-N-isopropyl-aniline)

Enamine-terminated polymers can be made by reacting a molar excess of monoenamine having the structure

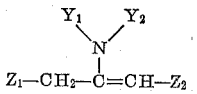

with an organic polyisocyanate (or isothiocyanate). Mixtures can be employed, when desired.

In the process of the present invention, enamines are reacted with the XCN-terminated polymers to form higher polymers having $$-\overset{X}{\underset{\|}{C}}-NH-$$

links incorporated therein. By selecting suitable proportions of reactants, the process can be varied so as to cause only a small increase in the degree of polymerization or it can be used to obtain a fully chain-extended cross-linked vulcanizate.

The proportions of reactants can be calulated on the basis that each enamine group

can consume two XCN-groups to form the corresponding dicarboxamide (or dithiocarboxamide). If the enamine is already substituted by one carboxamide (or thiocarboxamide) group, it will react with only one more NCX-group. Thus, a mono-enamine such as

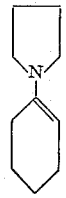

or an enamine-terminated polyamide such as

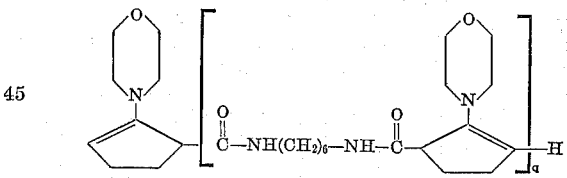

will react with 2 XCN-groups whereas a monomeric di-enamine, e.g.

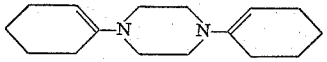

will consume as many as 4. Infinite extension for curing will occur when the number of XCN-reactable sites is equal to the number of XCN-groups. When the number of sites is less than the number of XCN-groups, chain extension to an XCN-terminated product will occur. When the number of sites is greater than the number of XCN-groups, chain extension to an enamine-terminated product will result. The enamine molecule should provide at least 2 XCN-reactable sites if chain extension is to occur, of course.

In operating the process of the present invention the reactants can be added in any order, at one time or intermittently or continuously. Water is rigorously excluded in order to avoid decomposing the enamine to the ketone. The reaction temperature is not critical; common values range from room temperature (20–30° C.) to about 160° C., 80 to 135° C. frequently being convenient. For a particular set of reactants, the reaction time needed can be shortened by raising the temperature. Representative reaction periods range from 3 minutes to 48 hours. The reaction time required will depend somewhat on the particular enamine being employed; those skilled in the art can readily determine the combination of temperature and time most suited for operating convenience. It appears that the most reactive enamines are the 5—5 cyclic species, such as

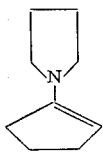

made from pyrrolidines and cyclopentanones. Heat evolution and near curing may occur merely on mixing a 5—5 enamine with an organic polyNCX compound at room temperature; a subsequent final cure step of 3–5 minutes at 121° C. is typical. The larger the ring, the less reactive the enamine. A representative 6—6 type

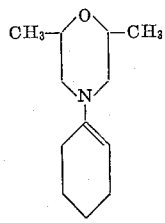

can require reaction time as long as 2 days at 135° C. The activity of a half open chain enamine appears to be less than that of its wholly cyclic analogue.

In order to obtain the best results it is desirable to mix the reactants homogeneously. If both are solids at room temperature, one or both can be melted prior to mixing or the heterogeneous mixture can be heated until molten. Alternatively, the solid reactants can be mixed in a Banbury mixer, in a ball mill, or on a rubber roll mill. Since the polyNCX compounds are adhesives for metal, care must be taken when using this approach. An inert liquid medium can be employed for convenience when desired. This is particularly advantageous when undesirably high temperatures are required to get a homogeneous reaction mixture. The inert liquid medium is "inert" in the sense that it does not adversely affect the desired course of reaction; thus the medium is free from enamine-reactable compounds such as acyl halides, benzyl halides, water, cyanogen chloride, $\alpha,\beta$-unsaturated nitriles, $\alpha,\beta$-unsaturated esters, and $\alpha,\beta$-unsaturated ketones; furthermore, it is free from XCN-reactable compounds such as hydrogen sulfide, alcohols, carboxylic acids, mercaptans, phenols, thiophenols, and other compounds containing groups bearing Zerewitinoff-active hydrogen atoms. The total concentration of reactants is not critical; ease of stirring and other factors of operating convenience will determine the maximum concentration chosen by those skilled in the art; excessive dilution will often be avoided to minimize solvent recovery costs and to maximize the yield per unit volume of reactor space. Aromatic hydrocarbons (such as benzene, toluene, and m-xylene), aliphatic hydrocarbons (such as n-pentane), aliphatic acyclic ethers (such as diethyl ether); heterocyclic ethers (such as tetrahydrofuran), lower alkyl esters (such as ethyl acetate), chlorinated aromatic hydrocarbon (such as o-dichlorobenzene), chlorinated vinyl hydrocarbons (such as trichloroethplene and tetrachloroethylene), and dimethyl formamide are representative liquid media. Mixtures of two or more miscible liquids (such as a mixture of dimethyl formamide and tetrahydrofuran) can be employed when desired. The reaction products can be isolated by conventional means. Precipitates, for example, can be collected by filtration or centrifugation. Soluble products can, when desired, be freed from solvent by evaporaiton, spray drying, or by admixture with non-solvents. For some applications, as hereinafter described, such as coatings, it is advantageous to leave the reaction product in solution in a volatile solvent.

The present invention is broadly useful in making and curing polyisocyanate and polyisothiocyanate compositions. It can be employed to cure liquid NCX-terminated polymers, such as polyalkyleneether (or polyester) polymers, for encapsulating electronic equipment and making molded solid articles, fibers, films, calks, and coatings. Cellular products useful for fabricating crash pads, topper pads, resilient cushions, rigid insulation panels, and the like, result when gas or a gas-forming agent (such as trichloromonofluoromethane, dichlorodifluoromethane or N,N - dinitrosopentamethylenetetramine) is incorporated for expanding the liquid mixture prior to cure. Solutions of polyisocyanates (or polyisothiocyanates) and enamines in volatile inert liquid media can be applied to substrates such as wood, glass, or steel by conventional methods such as roll coating, swabbing, or spraying to form highly useful coatings and films. The inert liquid media are free from Zerewitinoff-active hydrogen atoms or enamine-reactive groups. Representative classes of solvents include the above-described aliphatic or aromatic hydrocarbons, aliphatic ethers, and aliphatic esters.

The present invention provides a valuable way of building in a controlled degree of amide character into a polyurethane structure to reinforce it, that is to increase the modulus, tensile strength at the break, the tear resistance, and the abrasion resistance. The proportion of amide groups in the composition will depend upon the type of enamine and the fraction of the isocyanate groups which are reacted with an enamine instead of a conventional agent such as a glycol or a diamine. For a given number of isocyanate groups: the monomeric enamine which will give the highest proportion of amide groups will be the one with the lowest molecular weight; the highest proportion of amide groups will be supplied by an enamine-terminated polyamide having the highest degree of polymerization and repeating units of the lowest molecular weight. For a given number of XCN-groups, the greater the proportion which react with an enamine, the greater the degree of amide character introduced. A particularly beneficial result of the reinforcement made possible by the amide groups is in the preparation of injection molded thermoplastic articles, especially elasto-plastics. Suitable thermoplastics should be high melting and it is desired that the processing temperature should be above 170° C. Although urethanes can be reinforced by introduction of urea linkages, they are adversely affected by the high processing temperatures. In contrast, amide linkages are very stable and the amide reinforced urethanes can be injection molded at temperatures above 170° C. The thermoplastic amide reinforced urethanes combine advantages of good thermal stability with attractive tensile strength and abrasion resistance.

It is to be understood that part of the XCN-groups can be reacted, if desired, with functional groups of the conventional sort. Thus polyNCX compositions can be cured by combinations of enamines and glycols, enamines and hexols, enamines and bismercaptans, enamines and dicarboxylic acids, enamines and methylenedianilines, and the like. Reagents such as water, which decompose enamines, should be absent. Thioamide character can be built-in using polyisothiocyanates in a manner analogous to that of the polyisocyanates.

The following examples will better illustrate the nature of the present invention; however, the invention is not intended to be limited to these examples. Parts are by weight unless otherwise indicated.

EXAMPLE 1

(A) *Preparation of polyurethane polymer.* — 348.4 parts of toluene-2,4-diisocyanate and 1000 parts of anhydrous polytetramethyleneether glycol (number-average molecular weight 1000) are agitated at 80° C. for 4 hours in a dry reactor protected from atmospheric moisture.

The polyurethane polymer thus obtained has a free NCO-group content of 6.4% by weight and a Brookfield viscosity at 30° C. of 6000 to 7000 cps.

(B) *Curing polyurethane polymer with an enamine.*—A 50-gram sample of the polymer prepared in A above was warmed, stirred under vacuum to remove air bubbles, and finally cooled almost to room temperature. After 4.6 grams of 1-(1-cyclopenten-1-yl)pyrrolidine had been added, the resulting composition was stirred vigorously under reduced pressure for a few minutes. The mass became very hot and rubbery. It was then press cured at 121° C., 400 lb./sq.in., for 3 minutes giving a rubbery slab exhibiting a Shore A hardness of 66.

EXAMPLE 2

(A) *Preparation of polyurethane polymer.*—A vigorously agitated mixture consisting of 493.8 parts of a toluene diisocyanate isomer (80% 2,4-, 20% 2,6-) mixture and 120.1 parts of polypropyleneether polyol (having a number-average molecular weight of about 680 and made by reacting about 8.59 moles of 1,2-propylene oxide with 1 mole of sorbitol) is heated to 85° C., cooled rapidly to 70° C., and held at 70° C. for one hour in a dry reactor protected from atmospheric moisture. The polyurethane polymer thereby obtained has a free NCO-group content of 31.3% by weight.

(B) *Curing polyurethane polymer with an enamine.*—A 30-gram sample of the polymer prepared in A above was mixed at room temperature with 18.7 grams 4-(1-cyclohexen-1-yl) morpholine, 0.3 gram of polydimethyl siloxanepolyether block copolymer (made in accordance with Example I(a) of U.S. Patent 2,834,748), 8 grams of trichloromonofluoromethane, 1 drop of stannous octoate, and 7 drops (about 0.13 gram) of N,N,N',N'-tetramethyl-1,3-butanediamine. The resulting composition was vigorously stirred for 20 seconds and poured into a wax-lined mold. After the mass had stopped expanding, it was transferred to a 120° C. oven for one hour. A hard tack-free polyurethane foam was obtained.

EXAMPLE 3

(A) *Preparation of enamine-terminated polyamide.*—Eight grams (0.054 mole) of 4-(1-cyclohexen-1-yl) morpholine and 4.0 grams (0.0229 mole) of toluene-2,4-diisocyanate were stirred together at 25° C. A very exothermic reaction took place. When cool, the mixture became a glassy brittle resin. This product was an enamine-terminated polyamide having the following structure

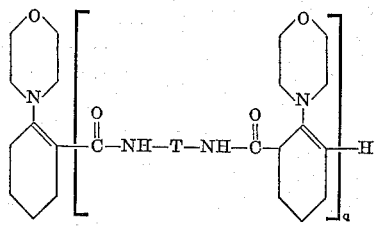

where T is the divalent radical

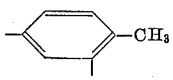

(B) *Preparation of polyisocyanate composition.*—One hundred and thirty grams of polytetramethyleneether glycol (number-average molecular weight 951) and 60 grams of a toluene diisocyanate isomer (80% 2,4-, 20% 2,6-) mixture were mixed at 25° C. with vigorous stirring under nitrogen and heated thereafter at 80–82° C. for 70 minutes. The liquid product contained 9.28% NCO-groups by weight.

(C) *Curing polyisocyanate composition with the enamine.*—A 0.4-gram sample of the polyamide prepared in A above was ground in a mortar with 3 grams of polyisocyanate composition prepared in B above to form a paste. A 2-day cure at 135° C. yielded an elastomeric slab.

EXAMPLE 4

(A) Twelve grams (0.072 mole) of 4-(1-cyclohexen-1-yl) morpholine was added with stirring at 25° C. to 25 grams (0.144 mole) of toluene-2,4-diisocyanate. Strong heat evolution occurred and the mixture quickly became too thick to stir. It was then allowed to cool to room temperature over a ½-hour period. The NCO-terminated polyamide obtained, which had the structure

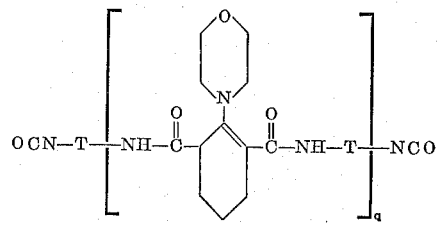

where T is the divalent radical

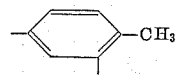

was a brittle solid analyzing for 14.75% NCO (indicating that the average value of q was about 1).

(B) Four grams (0.024 mole) of 4-(1-cyclohexen-1-yl) morpholine was reacted with 16 grams (0.0919 mole) of toluene-2,4-diisocyanate by the procedure of Part A above to obtain a liquid polyisocyanate composition analyzing for 29.7% NCO. A 14.3-gram sample of this composition was mixed with 6.5 grams of polypropyleneether hexol (having a number-average molecular weight of about 680 and made by reacting about 8.59 moles of 1,2-propylene oxide with 1 mole of sorbitol) 0.2 gram of a polydimethyl siloxane-polyether block coplolymer (made in accordance with Example I(a) of U.S. Patent 2,834,-748), 4 grams of trichloromonofluoromethane, 3 drops of N,N,N',N'-tetramethyl-1,4-butanediamine, and one drop of stannous octoate. Heat was evolved and the mixture expanded to give a very rigid tack-free foam exhibiting an excellent cell structure.

EXAMPLE 5

A mixture consisting of 50 grams of the polymer prepared in Example 1A above and 6.6 grams of 4-(1-cyclohexen-1-yl)-2,6-dimethyl morpholine was formed at room temperature with stirring and heated to 80° C. over a 2-minute period. It was then poured into an open mold and heated therein at 80° C. for 20 hours. A soft rubbery vulcanizate resulted which was soluble in an 87/13 mixture of tetrahydrofuran and dimethylformamide.

EXAMPLE 6

(A) *Preparation of polyurethane polymer.*—A mixture consisting of 348.4 parts of toluene-2,4-diisocyanate, 45 parts of 1,3-butanediol and 500 parts of anhydrous polytetramethyleneether glycol (having a number-average molecular weight of 1000) is agitated at 80° C. for 4 hours under a protective nitrogen atmosphere in a dry reaction vessel. The polyurethane polymer thereby obtained has an NCO-group content of 9.4% by weight and a Brookfield viscosity at 30° C. of about 14,000 c.p.s.

(B) *Curing polyurethane polymer with an enamine.*—A mixture consisting of 50 grams of the polymer prepared in A above and 11.1 grams of 4-(1-cyclohexen-1-yl)-2,6-dimethyl morpholine was stirred together at room temperature and heated to 80° C. over a 2-minute period. It was then poured into an open mold and cured therein at 100° C. for 15 hours. A very hard vulcanizate was obtained.

EXAMPLE 7

Fifty grams of the polymer prepared in Example 1A and 9.25 grams of 1,4-bis(1-cyclohexen-1-yl) piperazine were mixed at room temperature and thereafter heated to 125° C. while stirred. The composition formed a rubbery solid which was subsequently cured at 80° C. for 14 hours to a very tough elastomer. This product was soluble in an 87/13 mixture of tetrahydrofuran and dimethyl formamide.

EXAMPLE 8

Fifty grams of the polymer prepared in Example 1A, 4.62 grams of 1-(1-cyclohexen-1-yl)-2,6-dimethyl morpholine, and 3.13 grams of 1,4-bis(1-cyclohexen-1-yl) piperazine were mixed together at room temperature; while stirred, the resulting composition was heated rapidly to 120 °C. held there for 3 minutes. It was then poured into an open mold and cured therein for 24 hours at 80° C. The vulcanizate obtained exhibited the following properties at 25° C.: $M_{300}$, 200 lb./sq.in.; $T_B$, 100 lb./sq.in.; $E_B$, 510%; permanent set 2%; Shore A hardness 40; Yerzley resilience 25%; tear strength, 23 lb./in.

EXAMPLE 9

The following compositions were made:
(A) Polyurethane polymer of Example 1A, 50 grams, N,N-di-n-butyl-1-cyclohexen-1-ylamine, 6.84 grams.
(B) Polyurethane polymer of Example 1A, 50 grams; N-(2-penten-3-yl)-morpholine, 5.08 grams.
(C) Polyurethane polymer of Example 1A, 50 grams; 1-(α-benzyl-styryl)pyrrolidine, 8.60 grams.
(D) Polyurethane polymer of Example 1A, 50 grams; 1-(N-methylanilino)-1-cyclohexene, 6.12 grams.

Each composition was rapidly degassed by stirring under vacuum at 100° C. poured into a mold, and heated therein at 100° C. for 22 hours. Composition B exhibited the greatest viscosity increase. The procedure was repeated except that the molds were at room temperature instead of 100° C. Compositions A and B increased more in viscosity than Compositions C and D did.

As many widely different embodiments of this invention may be made without departing from the spirit and scope thereof, it is to be understood that this invention is not limited to the specific embodiments thereof except as defined in the appended claims.

What is claimed is:
1. A composition obtained by reacting a polyurethane having a molecular weight of from 500 to about 20,000 and having at least two XCN-groups per molecule, wherein X is selected from the group consisting of oxygen and sulfur, with an organic compound having at least one enamine structural unit, said enamine unit being represented as follows:

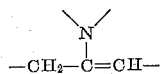

wherein the residual valences are attached to carbon atoms, with the provisos that (a) at least one residual nitrogen valence is attached to an aliphatic carbon atom, (b) any aliphatic carbon atoms attached to the nitrogen atom are selected from the group consisting of primary and secondary carbon atoms, and (c) the compound is free from enamine-reactable substituents.

2. A composition of claim 1 wherein the XCN groups are OCN— and the organic compound contains 2 enamine units.

3. A composition of claim 2 wherein the polyurethane is obtained by reacting a polyalkyleneether glycol with a molar excess of an organic diisocyanate.

4. A composition of claim 3 wherein the compound having 2 enamine units is 1,4-bis(1-cyclohexen-1-yl) piperazine.

5. A composition obtained by reacting a polyurethane having at least two OCN-groups per molecule and having a molecular weight of from 500 to about 20,000 with a monomeric monoenamine of the structure

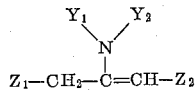

wherein $Y_1$, $Y_2$, $Z_1$ and $Z_2$ are radicals, which are inert toward isocyanates and enamines, selected from the group consisting of hydrocarbon and substituted hydrocarbon radicals said substituents being from the group consisting of nitro, alkoxy, aryloxy, thioalkoxy and thioaryloxy; with the provisos that (a) $Y_1$ is joined to the nitrogen atom bearing $Y_2$ through a carbon atom selected from the group consisting of primary aliphatic and secondary aliphatic carbon atoms; (b) at least one of the pairs $Y_1$—$Y_2$ and $Z_1$—$Z_2$ is joined together to form a 5 to 7 membered ring, said members being selected from the group consisting of carbon atoms and not more than one heteroatom from the group consisting of sulfur, oxygen, and a tertiary nitrogen atom having a hydrocarbon radical attached thereto; and (c) any aliphatic carbon atom joining $Y_2$ to the nitrogen atom bearing $Y_1$ is selected from the group consisting of primary and secondary aliphatic carbon atoms.

6. A composition of claim 5 wherein the monoenamine is 1-(1-cyclopenten-1-yl) pyrrolidine.

7. A composition of claim 5 wherein the monoenamine is 4-(1-cyclohexen-1-yl)-2,6-dimethyl morpholine.

8. A composition of claim 5 wherein the polyurethane is obtained by reacting a polyalkyleneether glycol with a molar excess of an organic diisocyanate.

9. A composition of claim 8 wherein the polyalkyleneether glycol is a polytetramethyleneether glycol and the organic diisocyanate is toluene-2,4-diisocyanate.

References Cited by the Examiner
UNITED STATES PATENTS

| | | | |
|---|---|---|---|
| 2,929,800 | 3/1960 | Hill | 260—77.5 |
| 2,944,998 | 7/1960 | Buxbaum | 260—45.8 |
| 3,054,757 | 9/1962 | Britain | 260—2.5 |
| 3,146,219 | 8/1964 | Beitchman | 260—75 |
| 3,182,060 | 5/1965 | Berchtold | 260—247.2 |

OTHER REFERENCES

Journal of Organic Chemistry, vol. 26, August 1961, pp. 3043–3044 cited of interest.

DONALD E. CZAJA, *Primary Examiner.*

H. BURSTEIN, F. McKELVEY, M. C. JACOBS,
*Assistant Examiners.*